United States Patent
Cleary et al.

(10) Patent No.: US 7,379,799 B2
(45) Date of Patent: May 27, 2008

(54) METHOD AND SYSTEM FOR HIERARCHICAL FAULT CLASSIFICATION AND DIAGNOSIS IN LARGE SYSTEMS

(75) Inventors: Daniel Joseph Cleary, Schenectady, NY (US); LiJie Yu, Clifton Park, NY (US); Mark David Osborn, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 310 days.

(21) Appl. No.: 11/171,961

(22) Filed: Jun. 29, 2005

(65) Prior Publication Data
US 2008/0039993 A1 Feb. 14, 2008

(51) Int. Cl.
*G01M 17/00* (2006.01)

(52) U.S. Cl. .................. 701/29; 701/33; 701/36; 340/425.5; 340/439

(58) Field of Classification Search .......... 701/2, 701/29, 30, 33, 34–36; 340/425.5, 438, 439
See application file for complete search history.

(56) References Cited

U.S. PATENT DOCUMENTS 6,757,668 B1 * 6/2004 Goebel et al. .............. 706/59

| | | | |
|---|---|---|---|
| 2004/0117150 A1 | 6/2004 | Cuddihy et al. | 702/182 |
| 2005/0021212 A1* | 1/2005 | Gayme et al. | 701/99 |
| 2005/0096873 A1* | 5/2005 | Klein | 702/184 |

* cited by examiner

*Primary Examiner*—Gertrude A. Jeanglaude
(74) *Attorney, Agent, or Firm*—Fletcher Yoder (57) ABSTRACT

A method for diagnosing and classifying faults in a system is provided. The method comprises acquiring operational data for at least one of a system, one or more subsystems of the system or one or more components of the one or more subsystems. Then, the method comprises analyzing the operational data using one or more diagnostic models. Each diagnostic model uses the operational data to determine a probability of fault associated with at least one of the one or more components or the one or more subsystems. Finally, the method comprises deriving an overall probability of fault for at least one of the system, the one or more subsystems, or the one or more components using the one or more probabilities of fault determined by the one or more diagnostic models and one or more hierarchical relationships between the subsystems and components of the system.

20 Claims, 4 Drawing Sheets

METHOD AND SYSTEM FOR HIERARCHICAL FAULT CLASSIFICATION AND DIAGNOSIS IN LARGE SYSTEMS

BACKGROUND

The invention generally relates to fault diagnosis and classification in large systems and more specifically to a method and system for diagnosing and classifying faults in a large system, wherein the components of the system are organized in a hierarchical interrelated manner.

A number of diagnostic models have been developed to identify, diagnose and classify faults in large systems, such as locomotives, aircraft engines, automobiles, turbines, computers and appliances. However, due to the complexity of such large systems, the use of an individual diagnostic model to isolate and classify faults may not provide an optimal evaluation of the performance of such large systems.

In order to overcome some of the challenges associated with the use of a single diagnostic model to isolate faults, a number of decision fusion techniques have been developed that combine model evidence from multiple diagnostic models, assure model compatibility and produce an accurate and efficient evaluation of the performance status of a system. Some of these techniques include the decision consensus approach and the most competent approach. The decision consensus approach accepts the decision of a majority of classifiers from each diagnostic model as the fused decision while the most competent approach accepts the decision of the most competent classifier. Another commonly used approach is to combine individual decisions from each diagnostic model within the decision fusion framework using weighted probabilities across all the classifiers and adjusting the associated weights based on historical performance, to optimize the overall diagnostic fusion decision. Other decision fusion techniques include layering information by weakening or strengthening individual decisions based on specific criteria.

One common characteristic of the existing decision fusion techniques is that a "flat" fault classification model is assumed. That is, all potential classification categories are considered as non-overlapping and independent. Therefore, subcomponent hierarchy interactions or subsystem hierarchy interactions within a system cannot be easily captured. In addition, the above decision fusion techniques lack the capability to integrate overlapped faults that are often observed from independently developed diagnostic models, especially when each diagnostic model includes information from heterogeneous information sources.

Several challenges exist in developing an effective decision fusion framework to diagnose large complex systems failures. Firstly, the development of individual decision models within the decision framework is generally based on diverse techniques and each decision model may provide different capability levels in terms of coverage and reliability. In addition, fault classification and granularities usually differ from one decision model to another and the results produced by the various decision models may even be contradictory. Finally, the information to be combined and considered from the various decision models may be highly heterogeneous in nature, including both categorical and continuous data.

Therefore, there is a need for the development of a hierarchical fault classification framework that is capable of providing decision fusion among largely diverse diagnostic models. In addition, there is a need for the development of a hierarchical fault classification framework that is capable of handling hierarchical subcomponent and subsystem interactions among the components of a large system.

BRIEF DESCRIPTION

Embodiments of the present invention address these and other needs. In one embodiment, a method for diagnosing and classifying faults in a system is provided. The method comprises acquiring operational data for at least one of a system, one or more subsystems of the system or one or more components of the one or more subsystems. Then, the method comprises analyzing the operational data using one or more diagnostic models. Each diagnostic model uses the operational data to determine a probability of fault associated with at least one of the one or more components or the one or more subsystems. Finally, the method comprises deriving an overall probability of fault for at least one of the system, the one or more subsystems, or the one or more components using the one or more probabilities of fault determined by the one or more diagnostic models and one or more hierarchical relationships between the subsystems and components of the system.

In another embodiment, a processor-based system is provided. The system comprises an input device configured to receive operational data for at least one of a system, one or more subsystems of the system or one or more components of the one or more subsystems. The system further comprises a processor, a storage device and an output device. The processor is configured to execute routines to analyze the operational data using one or more diagnostic models. Each diagnostic model uses the operational data to determine a probability of fault associated with at least one of the one or more components or the one or more subsystems. The processor is further configured to derive an overall probability of fault for at least one of the system, the one or more subsystems, or the one or more components using the one or more probabilities of fault determined by the one or more diagnostic models and one or more hierarchical relationships between the subsystems and components of the system. The storage device is coupled to the processor and stores the results of the analysis of the operational data by the processor. The output device is coupled to the processor and displays the results of the analysis.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
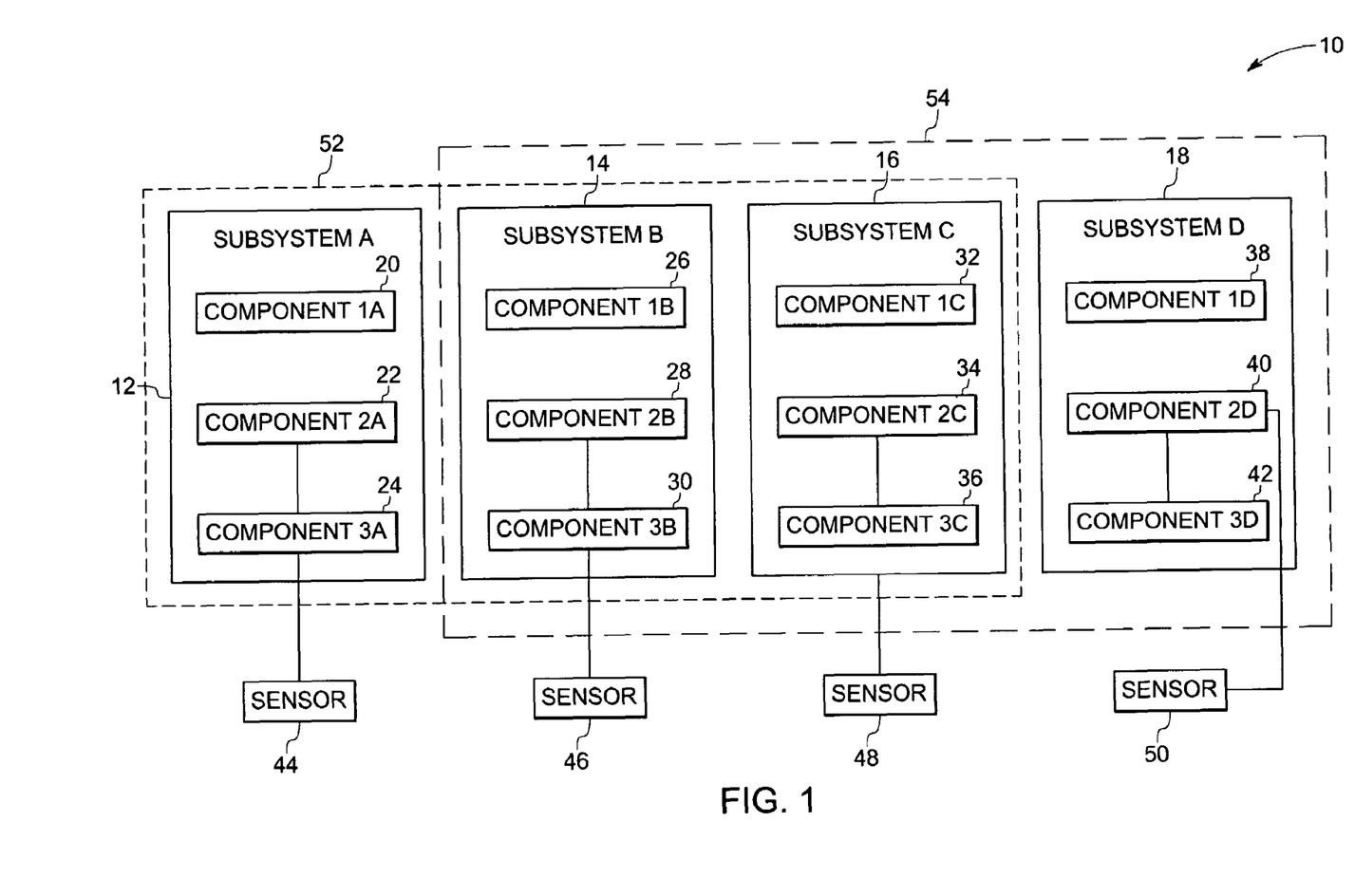
FIG. 1 is an exemplary illustration of a large system comprising one or more subsystems and components.

FIG. 1 is an exemplary illustration of a large system 10 comprising one or more subsystems and components. As shown in FIG. 1, system 10 includes one or more subsystems represented generally by the reference numerals 12, 14, 16 and 18. Each of the subsystems 12, 14, 16 and 18 may further include one or more components represented generally by the reference numerals 20, 22, 24, 26, 28, 30, 32, 34, 36, 38, 40 and 42 as shown in FIG. 1.

Further, the subsystems and components of system 10 may be organized to function in an interrelated and coordinated manner. For example, as shown in FIG. 1, an exemplary grouping between subsystems A, B and C within system 10 is illustrated by the reference numeral 52. Similarly reference numeral 54 is an illustration of another exemplary grouping between subsystems B, C and D of system 10. One of ordinary skill in the art will recognize that the exemplary groupings depicted in FIG. 1 are for illustrative purposes only and are not meant to limit other possible groupings between the subsystems and components of system 10.

Further, one or more sensors, represented generally by the reference numerals, 44, 46, 48 and 50 may be coupled to the subsystems and/or components of system 10. In accordance with the present technique, the sensors 44, 46, 48 and 50 obtain information related to the operation of the subsystems and/or components of system 10. The operational information may include information about the pressure, temperature, software faults, hardware faults, airflow, fluid flow, speed or any other performance parameters associated with the components and/or subsystems of system 10. Further, the association of the sensors 44, 46, 48 and 50 to the components and subsystems of system 10 may be in the form of a direct physical connection (such as a wired connection) or a remote connection (such as a wireless infrared or RF connection). In addition, the operational information pertaining to the subsystems and components of system 10 may be provided directly to a data analysis system, as discussed herein, or may be stored for subsequent analysis on a data storage device.

Figure 2:
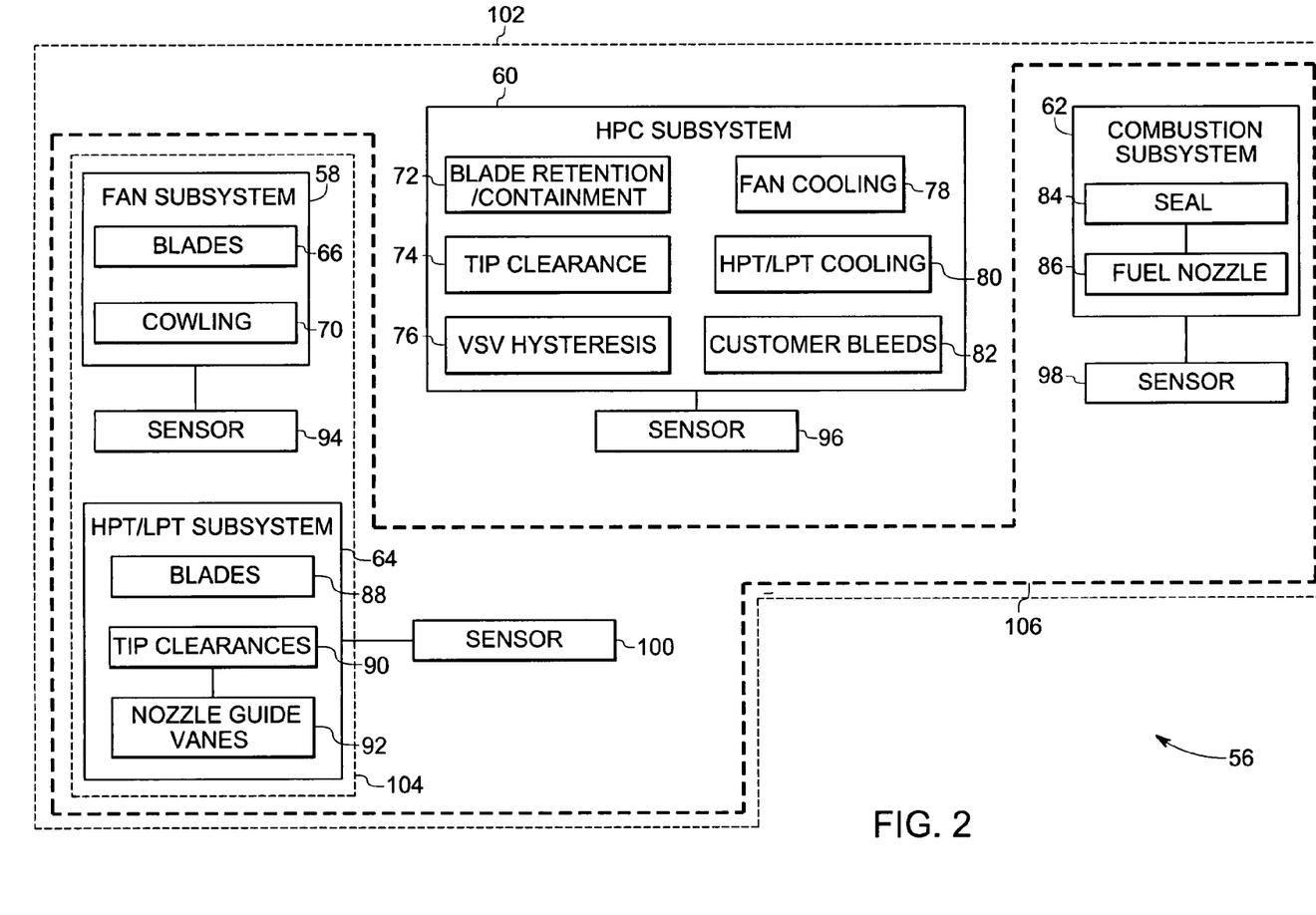
FIG. 2 is an exemplary illustration of the subsystems and components in an aircraft engine system.

FIG. 2 is an illustration of the subsystems and components in an exemplary aircraft engine system consistent with the system 10 discussed above. In accordance with one embodiment of the present invention, the aircraft engine system 56 includes a fan subsystem 58, a High Pressure Compressor (HPC) subsystem 60, a combustion subsystem 62 and a High Pressure Turbine/Low Pressure Turbine (HPT/LPT) subsystem 64.

The fan subsystem 58 receives ambient air, and represents the fan and air intake section of the aircraft engine system 56. In one embodiment of the present invention, the fan subsystem 58 includes a blade component 66 and a cowling component 70. Further, one or more sensors, represented generally by the reference numeral 94 may be coupled to the fan subsystem 58 or to its components. These sensors may include, intake air temperature sensors, vibration sensors, speed sensors and air pressure sensors.

The HPC subsystem 60 compresses the incoming air from the fan subsystem 58 to high pressure. In accordance with one embodiment, the HPC subsystem 60 includes a blade retention/containment component 72, a tip clearance component 74, a VSV hysteresis component 74, a fan cooling component 78, a HPT/LPT cooling component 80 and a customer bleeds component 82. As used herein, the customer bleeds component 82 refers to a bleed system for extracting air off of the HPC subsystem 60. Further, one or more sensors represented generally by the reference numeral 96 may be coupled to the HPC subsystem 60 or to its components. These sensors may include speed sensors, air pressure reading (inlet and outlet) sensors, and air temperature sensors.

The combustion subsystem 62 mixes fuel with pressurized air from the HPC subsystem 60 and generates combustion gases. In accordance with one embodiment, the combustion subsystem 62 includes a seal component 84 and a fuel nozzle component 86. As used herein, the seal component 84 and the fuel nozzle component 86 may comprise individual or collective seals or nozzles respectively. Further, one or more sensors represented generally by the reference numeral 98 may be coupled to the combustion subsystem 62 or to its components. These sensors may include temperature sensors and energy sensors to measure the temperature and energy variation of the compressed air from the HPC subsystem 60. In addition, the sensors 98 may include thermocouples, for measuring combustor temperatures, and combustor inlet and outlet air pressure sensors.

The combustion gases from the combustion subsystem 62 flow downstream through to the HPT/LPT subsystem 64 from which the combustion gases are discharged from the engine 56. In accordance with one embodiment of the present invention, the HPT/LPT subsystem 64 includes a blade component 88, a tip clearance component 90 and a nozzle guide vane component 92. As used herein, the blade component 88 and the vane component 92 may comprise individual or collective blades and vanes respectively. Further, one or more sensors represented generally by the reference numeral 100 may be coupled to the HPT/LPT subsystem 64 or to its components. The sensors may include speed sensors, exhaust gas temperature (EGT) sensors and air pressure sensors.

Figure 3:
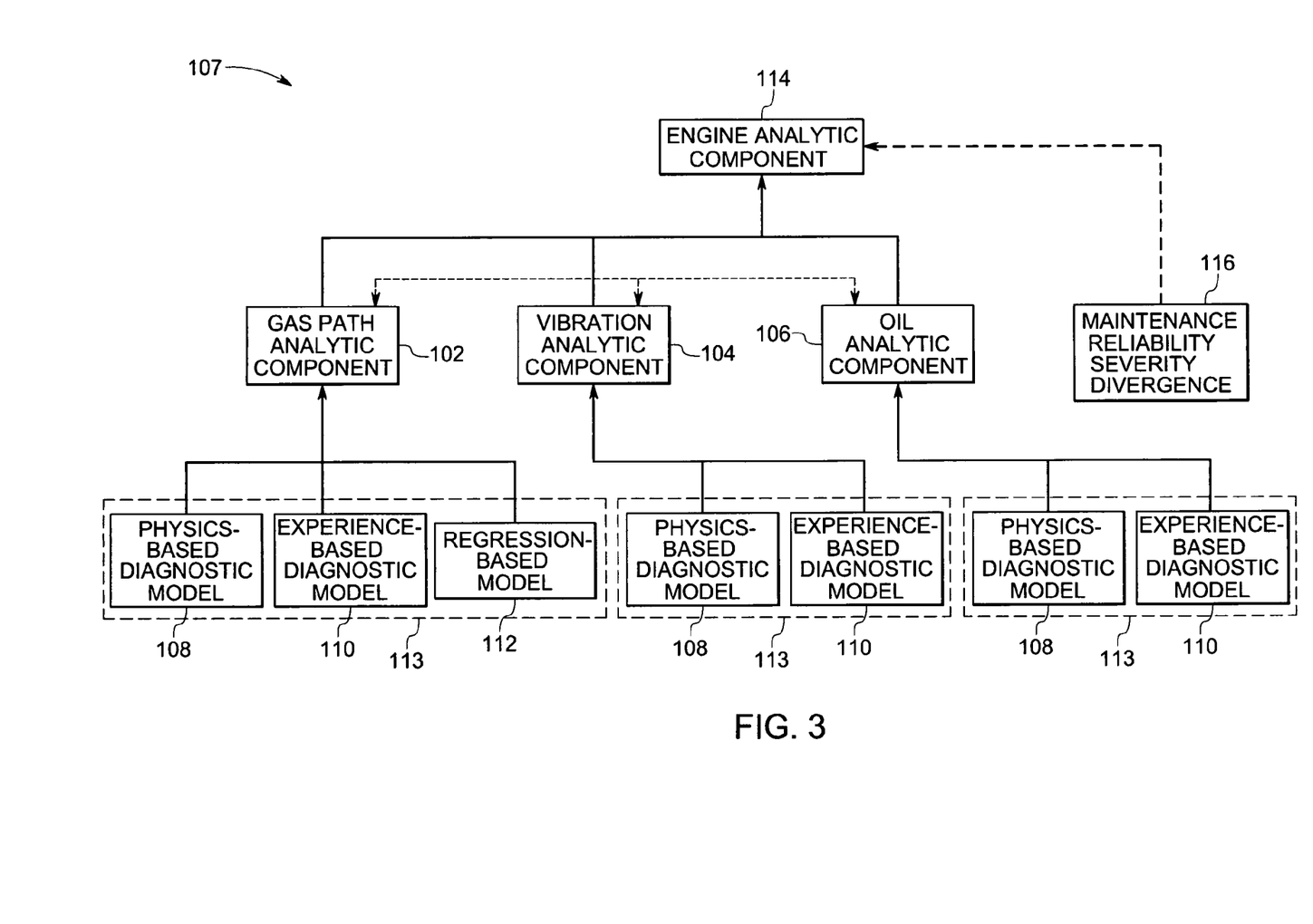
FIG. 3 is an illustration of a hierarchical fault classification framework for diagnosing and classifying faults associated with the subsystems and components of a system, in accordance with one embodiment of the present technique.

FIG. 3 is an illustration of an exemplary hierarchical fault classification framework for diagnosing and classifying faults associated with the subsystems and components of a system, in accordance with one embodiment of the present technique. As will be described in greater detail below, the depicted fault classification framework 107 is formed from a hierarchical arrangement of one or more logical groupings of the various subsystems and components of a system. In one embodiment of the present invention, the hierarchical fault classification framework 107 represents one or more logical groupings of the subsystems and components of the aircraft engine system 56 illustrated in FIG. 2. One of ordinary skill in the art will recognize that the above example of an aircraft engine system is for illustrative purposes and is not meant to limit other types of large and/or complex systems that may be hierarchically modeled and diagnosed using a hierarchical fault classification framework as described herein.

In accordance with a particular embodiment, the hierarchical fault classification framework 107 for the aircraft engine system 56 is formed based on a logical grouping of the fan subsystem 58, the HPC subsystem 60, the combustion system 62 and the HPT/LPT subsystem 64 into a gas path analytic component 102, a logical grouping of the fan subsystem 58 and the HPT/LPT subsystem 64 into a vibration analytic component 104, and a logical grouping of the fan subsystem 58, the combustion subsystem 62 and the HPT/LPT subsystem 64 into an oil analytic component 106. In addition, and as shown in FIG. 3, the gas path analytic component 102, the vibration analytic component 104 and the oil analytic component 106, along with other respective analytic components, may further be logically combined to form an engine analytic component 114.

In accordance with this embodiment, a fault in the gas path analytic component 102 may be caused due to a fault in the fan subsystem 58, the HPC subsystem 60, the combustion subsystem 62 or the HPT/LPT subsystem 64. As will be appreciated by those skilled in the art, a fault in the fan subsystem 58 may be caused by fan blade damage, typically occurring due to bird strikes or other foreign object damage during takeoff. A fault in the HPC subsystem 60 may be caused by a compressor blade damage or abnormal operation. A fault in the combustion subsystem 62 may be caused by holes burnt in liner and hot gas leaks into the bypass duct. A fault in the HPT/LPT subsystem 64 may be caused by a partial loss of one or more blades, most commonly during high power conditions. Similarly, a fault in the vibration analytic component may be caused due to a fault in the fan subsystem 58 or the HPT/LPT subsystem 64. A fault in the oil analytic component 106 may be caused due to a fault in fan subsystem 58, the combustion subsystem 62 or the HPT/LPT subsystem 64. In view of the variety of faults that may impact the operation of the different subsystems, one of ordinary skill in the art will appreciate that it may be difficult to discern what component or components are responsible for a fault or failure within a particular subsystem.

Referring to FIG. 3 again, the hierarchical fault classification framework 107 may further include one or more diagnostic models, represented generally by the reference numeral 113. In a particular embodiment, the diagnostic models include a physics-based diagnostic model 108, an experience-based diagnostic model (such as a model based on fuzzy logic or Bayesian statistical models) 110 and a regression-based model 112. The physics-based diagnostic model 108 generates a probability of fault for a subsystem or a component based on data trend deviation from a first principal system model. As used herein, a "first principle system model" refers to a model that is derived based on the physics of a particular system. The experience-based diagnostic model 110 generates a probability of fault for a subsystem or component consistent with an expert opinion or a data-driven evaluation of the subsystem or component. The regression-based model 112 measures output variable changes based on sensor inputs when predictions rather than descriptions are sought. While the experience and physics-based models provide fuller causality and understanding of the underlying anomaly, a regression-based model may provide more predictive accuracy, particularly when causality is less understood. As will be appreciated by those of ordinary skill in the art, though physics, experience, and regression-based models are discussed herein for the purpose of illustration, other modeling approaches may also be suitable for use in accordance with the present techniques.

The hierarchical fault classification framework 107 may additionally incorporate or otherwise account for secondary evidential information 116 about the aircraft engine system 56. In one embodiment, the secondary evidential information includes information about the historical and/or expected operation of the system 56 such as maintenance history information, reliability information, severity information and divergence information. Secondary evidence is often provided for the purpose of diagnostics and prognostics. This type of data is usually more categorical than continuous, involving relationships that are usually general in nature and possibly less well understood. Therefore, this evidence is not factored in at the component or sub-system level, but is considered more loosely after previous analysis has been performed. For instance, divergence refers to the performance of a component or sub-system as compared with other similar components or sub-systems in similarly performing configurations. Secondary evidence such as maintenance history can be used as a-priori probabilities when combining hierarchical elements.

In accordance with one embodiment, and as will be described in greater detail below, the diagnostic models 108, 110 and 112 acquire operational data from the plurality of sensors, such as for example, 94, 96, 98 and 100 (shown in FIG. 2) and determine a probability of fault associated with the one or more components and/or the one or more subsystems of the system 56 based on the operational data. An overall probability of fault for the system, subsystems and/or components of the system is then derived based on the probabilities of fault determined by the diagnostic models 108, 110 and 112 and one or more hierarchical relationships between the subsystems and components of the system.

Referring to FIG. 3, to determine a probability of fault associated with either the gas path analytic component 102, the vibration analytic component 104 or the oil analytic component 106, each diagnostic model 108, 110 and 112, analyzes the operational data from the sensors coupled to the particular subsystems and components that form the analytic components 102, 104 and 106. As mentioned above, the operational data may include pressure information, speed information, air pressure information, temperature information and energy information related to the subsystems and components. In addition to the operational information from the sensors, the diagnostic models 108, 110 and 112 may also analyze the secondary evidential information 116 related to the subsystems and components.

Based on the operational data from the sensors and the secondary evidential information 116, each diagnostic model then derives a probability of fault for each component and/or subsystem that comprises the analytic components 102, 104 and 106. As mentioned above, the probabilities of fault derived by a particular diagnostic model are based on the technique upon which the diagnostic model is based. For example, and in accordance with one embodiment, the physics-based diagnostic model 108 evaluates the data trend deviation of each component or subsystem from a first principle system model and along with the information from the sensors and the secondary evidential information derives a probability of fault for each of the components and subsystems based on physical principles. Similarly, the experience-based diagnostic model 110 may be driven by a fuzzy inference approach, deriving a probability of fault for each of the components and subsystems based on analyzing the information from the sensors that are coupled to the subsystems and components, the secondary evidential information, and on expert opinion information and historical case analysis.

In accordance with aspects of the present technique, the hierarchical fault classification framework 107 may be represented or constructed as a hierarchical fault probabilistic network. In a particular embodiment, the probabilistic network is a Bayesian Belief Network (BBN). In accordance with the present technique, the probabilistic network is represented by a directed graph that captures the physical interactions among the subsystems and components of the system. In particular, the leaf nodes in the directed graph are configured to represent a superset of the most refined or precise engine system faults and the parent nodes are configured to represent less precise fault classifications and additionally serve as natural or logical groupings of engine subsystems and components. A disconnected graph in the probabilistic network represents an independent branch of engine subsystem and component faults. These graphs may be connected at some point as subsystem and component interactions become better understood. Further, and as will be described in greater detail below, the diagnostic models developed in accordance with the present invention, provide evidence for each root cause modeled in the network by connecting to the appropriate node.

In accordance with an exemplary operation of the present technique, each diagnostic model provides certain probabilistic assessments of the states of the components, the subsystems and the system captured within the hierarchical framework 107. In one embodiment, the probabilistic assessments made by the diagnostic models 108, 110 and 112 may not reflect the real probability for a fault to occur, but an estimate of the likelihood of matching certain fault patterns. In such cases, the assessments provided by the diagnostic models may be converted using a suitable probability density function. In certain other cases, the diagnostic models 108, 110 and 112 may directly provide an a priori probability, in which case, the results can be used directly in the probabilistic network. Additionally, the probabilistic assessments for the component, subsystem and system failure rates may also be derived from historical data and/or expert opinion. The probabilistic assessments of failure derived from each diagnostic model are then inserted into the probabilistic network model and propagated throughout the network. This propagation provides an estimate of the posterior probability of a failure mode for a component, subsystem or a system and represents knowledge about the true state of the failure mode for the component, subsystem or system.

Figure 4:
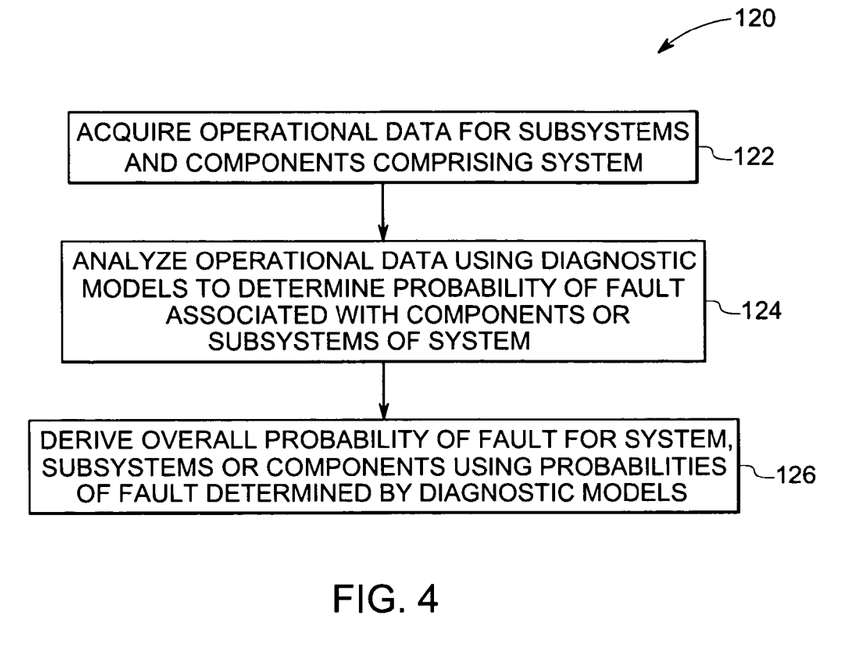
FIG. 4 is a flowchart of exemplary logic including exemplary steps for diagnosing and classifying faults in a system, in accordance with the present technique.

FIG. 4 is a flowchart of exemplary logic including exemplary steps for diagnosing and classifying faults in a system, in accordance with the present technique. In step 122, operational data is acquired for one or more components or one or more subsystems of the system. As described above, the operational data may be collected from a plurality of sensors coupled to the subsystems and components of the system. Alternatively, the operational data may also be acquired from a data storage device.

In step 124, the operational data is analyzed using one or more diagnostic models. As described above, the diagnostic models use the operational data to determine a probability of fault associated with the components or the subsystems of the system. As described above, the diagnostic models may include a physics-based diagnostic model, an experience-based diagnostic model and a regression-based model.

In step 126, an overall probability of fault for the system, subsystems and/or components comprising the system is derived using the probabilities of fault determined by the one or more diagnostic models and one or more hierarchical relationships between the subsystems and components of the system. In a particular embodiment, and as described above, a hierarchical fault probabilistic network provides probabilistic assessments of failure for a component, subsystem and/or the system, based on relevant outputs from each applicable diagnostic model. The probabilistic assessments are inserted into the probabilistic network model and propagated throughout the network. This propagation provides an estimate of the posterior probability of a failure mode for a component, subsystem or a system.

In an alternate embodiment, the operational data may be acquired for two or more logical groupings of subsystems. In a particular embodiment, the two or more logical groupings may comprise one or more common components. The diagnostic models as described above may then use the operational data to determine two or more probabilities of fault for each of the one or more common components using the operational data. The overall probability of fault for each of the one or more common components may then be derived based on the two or more probabilities of fault and on a hierarchical relationship between or within the two or more logical groupings of subsystems in a manner as described above.

Figure 5:
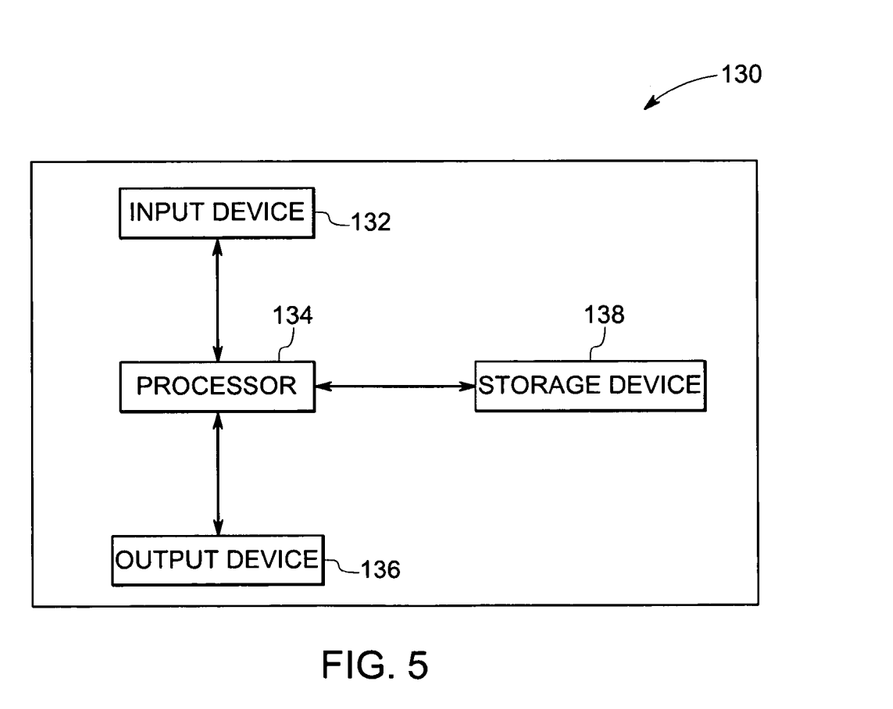
FIG. 5 is a diagrammatic representation of an exemplary processor-based system for performing the technique as explained with reference to FIGS. 1-4.

As will be appreciated by those of ordinary skill in the art, the techniques described above with reference to FIGS. 1-4 may be performed on a processor-based system, such as a suitably configured general-purpose computer or application specific computer. FIG. 5, for example, is a diagrammatic representation of an exemplary processor-based system 130 for performing the technique as explained with reference to FIGS. 1-4. In one embodiment, the system 130 includes an input device 132 configured to receive operational data for components, subsystems or a system in a manner as described above. The input device 132 may include one or more of a conventional keyboard, a mouse, or other operator input device. Alternatively, in another embodiment the operational data may be provided to the system 130 and the processor 134 not by an input device 132 but by a network or other communication connection configured to access the operational data from a remote location, such as a server or other storage device. A storage device 138 may be coupled to the processor 134 for storing the results of the analysis of the operational data by the processor 134. Likewise, routines for performing the techniques described herein may be stored on the storage device 138. The storage device 138 may be integral to the processor 134, or may be partially or completely remote from the processor 134 and may include local, magnetic or optical memory or other computer readable media, including optical disks, hard drives, flash memory storage, and so forth. Moreover, the storage device 138 may be configured to receive raw, partially processed or fully processed data for analysis. An output device 136 may be coupled to the processor 134 to display the results of analysis, which may be in the form of graphical illustration, and/or to provide operator interaction with the processor 134, such as to initiate or configure an analysis. The output device 136 may typically include a computer monitor for displaying the operator selections, as well as for viewing the results of the analysis according to aspects of the present technique. Such devices may also include printers or other peripherals for reproducing hard copies of the results and analysis. In accordance with aspects of the present technique, the processor 134 may be a data analysis system configured to execute routines to analyze the operational data using one or more diagnostic models. Each diagnostic model uses the operational data to determine a probability of fault associated with at least one of the components or the subsystems of the system. The processor 134 is further configured to derive an overall probability of fault for at least one of the system, the subsystems, or the components using the one or more probabilities of fault determined by the one or more diagnostic models and one or more hierarchical relationships between the subsystems and components of the system, in a manner as described above.

The hierarchical fault classification framework for diagnosing and classifying faults in a system as disclosed by embodiments of the present invention offers several advantages including the ability to capture subsystem and component level interactions of a large system using an extensible hierarchy. The disclosed hierarchical fault classification framework of the present invention is a hierarchical representation of one or more logical groupings of the various subsystems and components that form a system and determines a probability of fault for each component and subsystem in the hierarchical arrangement, using information decision inferences from a plurality of diagnostic models.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for diagnosing and classifying faults in a system, the method comprising:
   acquiring operational data for at least one of a system, one or more subsystems of the system or one or more components of the one or more subsystems;
   analyzing the operational data using one or more diagnostic models, wherein each diagnostic model uses the operational data to determine a probability of fault associated with at least one of the one or more components or the one or more subsystems; and
   deriving an overall probability of fault for at least one of the system, the one or more subsystems, or the one or more components using the one or more probabilities of fault determined by the one or more diagnostic models and one or more hierarchical relationships between the subsystems and components of the system.

2. The method of claim 1, wherein the system is an aircraft engine system.

3. The method of claim 1, wherein the step of deriving utilizes a probabilistic analysis comprising leaf nodes and parent nodes.

4. The method of claim 1, wherein the probability of fault derived by the one or more diagnostic models is propagated through a hierarchical fault network.

5. The method of claim 4, wherein the hierarchical fault network is a Bayesian Belief Network (BBN).

6. The method of claim 1, wherein the diagnostic models include at least one of a physics-based diagnostic model, an experience-based diagnostic model, or a regression-based model.

7. The method of claim 6, wherein the physics based diagnostic model generates a probability of fault based on a first principal system model.

8. The method of claim 6, wherein the experience-based diagnostic model generates a probability of fault based on an expert opinion evaluation of the subsystems.

9. The method of claim 1, wherein acquiring the operational data comprises collecting the operational data from a plurality of sensors coupled to at least one or more of the subsystems or the one or more components.

10. The method of claim 1, wherein acquiring the operational data comprises collecting the operational data from a data storage device.

11. A processor-based system, comprising:
   an input device configured to receive operational data for at least one of a system, one or more subsystems of the system or one or more components of the one or more subsystems;
   a processor configured to execute routines to analyze the operational data using one or more diagnostic models, wherein each diagnostic model uses the operational data to determine a probability of fault associated with at least one of the one or more components or the one or more subsystems and derive an overall probability of fault for at least one of the system, the one or more subsystems, or the one or more components using the one or more probabilities of fault determined by the one or more diagnostic models and one or more hierarchical relationships between the subsystems and components of the system;
   a storage device coupled to the processor for storing the results of the analysis of the operational data by the processor; and
   an output device coupled to the processor for displaying the results of the analysis.

12. A computer readable media, comprising:
   routines adapted to acquire operational data for at least one of a system, one or more subsystems of the system or one or more components of the one or more subsystems;
   routines adapted to analyze the operational data using one or more diagnostic models, wherein each diagnostic model uses the operational data to determine a probability of fault associated with at least one of the one or more components or the one or more subsystems; and
   routines adapted to derive an overall probability of fault for at least one of the system, the one or more subsystems, or the one or more components using the one or more probabilities of fault determined by the one or more diagnostic models and one or more hierarchical relationships between the subsystems and components of the system.

13. A method, comprising:
   acquiring operational data for two or more logical groupings of subsystems, wherein the two or more logical groupings comprise one or more common components;
   analyzing the operational data using one or more diagnostic models, wherein each diagnostic model uses the operational data to determine two or more probabilities of fault for each of the one or more common components using the operational data; and
   deriving an overall probability of fault for each of the one or more common components based on the two or more probabilities of fault and on a hierarchical relationship between or within the two or more logical groupings of subsystems.

14. The method of claim 13, wherein the step of deriving utilizes a probabilistic analysis comprising leaf nodes and parent nodes.

15. The method of claim 13, wherein the probabilities of fault derived by the one or more diagnostic models is propagated through a hierarchical fault network.

16. The method of claim 15, wherein the hierarchical fault network is a Bayesian Belief Network (BBN).

17. The method of claim 13, wherein the diagnostic models include at least one of a physics-based diagnostic model, an experience-based diagnostic model, or a regression-based model.

18. The method of claim 13, wherein acquiring the operational data comprises collecting the operational data from a plurality of sensors coupled to at least one or more of the common components.

19. A processor-based system, comprising:
   an input device configured to receive operational data for two or more logical groupings of subsystems, wherein the two or more logical groupings comprise one or more common components;
   a processor configured to execute routines to analyze the operational data using one or more diagnostic models, wherein each diagnostic model uses the operational data to determine two or more probabilities of fault for each of the one or more common components using the operational data and derive an overall probability of fault for each of the one or more common components based on the two or more probabilities of fault and on a hierarchical relationship between or within the two or more logical groupings of subsystems;

a storage device coupled to the processor for storing the results of the analysis of the operational data by the processor; and an output device coupled to the processor for displaying the results of the analysis.

20. A computer readable media, comprising:

routines adapted to acquire operational data for two or more logical groupings of subsystems, wherein each logical grouping has one or more common components;

routines adapted to analyze the operational data using one or more diagnostic models, wherein each diagnostic model uses the operational data to determine two or more probabilities of fault for each of the one or more common components using the operational data; and routines adapted to derive an overall probability of fault for each of the one or more common components based on the two or more probabilities of fault and on a hierarchical relationship between or within the two or more logical groupings of subsystems.

* * * * *